US009336176B2

(12) United States Patent
Cooklis et al.

(10) Patent No.: US 9,336,176 B2
(45) Date of Patent: May 10, 2016

(54) REMOTE ACCESS APPLIANCE WITH COMMUNICATION PROTOCOL AUTOSENSING FEATURE

(75) Inventors: John T. Cooklis, Madison, AL (US); Russell C. Hammond, Rogersville, AL (US); James R. Nore, Owens Cross Roads, AL (US); Timothy A. Johnson, New Hope, AL (US); Jonathan T. Ibarra, Owens Cross Roads, AL (US)

(73) Assignee: AVOCENT HUNTSVILLE CORP., Huntsville, AL (US)

(*) Notice: Subject to any disclaimer, the term of this patent is extended or adjusted under 35 U.S.C. 154(b) by 401 days.

(21) Appl. No.: 13/877,509

(22) PCT Filed: Sep. 29, 2011

(86) PCT No.: PCT/US2011/054035
§ 371 (c)(1),
(2), (4) Date: May 7, 2013

(87) PCT Pub. No.: WO2012/047719
PCT Pub. Date: Apr. 12, 2012

(65) Prior Publication Data
US 2013/0227185 A1    Aug. 29, 2013

Related U.S. Application Data

(60) Provisional application No. 61/389,616, filed on Oct. 4, 2010, provisional application No. 61/487,433, filed on May 18, 2011.

(51) Int. Cl.
*H04L 12/66* (2006.01)
*G06F 13/14* (2006.01)
(Continued)

(52) U.S. Cl.
CPC ........ *G06F 13/4282* (2013.01); *G06F 13/4072* (2013.01)

(58) Field of Classification Search
CPC ...................................... H04L 69/18
USPC ............ 710/11, 305; 439/166–175; 370/463, 370/419
See application file for complete search history.

(56) References Cited

U.S. PATENT DOCUMENTS 4,403,111 A * 9/1983 Kelly .................... G06F 13/385
178/2 B
5,247,522 A * 9/1993 Reiff ............................. 714/43
(Continued)

FOREIGN PATENT DOCUMENTS

CN      201130374 Y      10/2008
DE   10 2008 002861 A1   12/2009
WO      WO-94/27223 A1   11/1994

OTHER PUBLICATIONS

Cisco Systems Male RJ45 to RS232 Adapter Cable sales offer dated Septemder 4, 1973.*
(Continued)

*Primary Examiner* — Paul R Myers
(74) *Attorney, Agent, or Firm* — Harness, Dickey & Pierce, P.L.C.

(57) ABSTRACT

A remote access appliance ("appliance") is disclosed which includes an autosensing subsystem that automatically senses when an Ethernet device or a serial device has been connected to it. The appliance then automatically configures one or more internal components to operate with the sensed/connected Ethernet device or serial device. When a serial device connection is detected, the appliance is further able to automatically detect which one of two different, predetermined pinout configurations is being used by the serial device, and to automatically configure one or more internal components to accommodate the detected pinout configuration.

20 Claims, 4 Drawing Sheets

(51) Int. Cl.
*G06F 13/42* (2006.01)
*G06F 13/40* (2006.01)

(56) References Cited

U.S. PATENT DOCUMENTS

| | | | | |
|---|---|---|---|---|
| 5,260,612 | A | * | 11/1993 | Lehmann et al. ............... 326/68 |
| 5,568,525 | A | * | 10/1996 | de Nijs et al. ................. 375/356 |
| 5,574,722 | A | * | 11/1996 | Slykhouse et al. ............ 370/257 |
| 5,634,074 | A | | 5/1997 | Devon et al. |
| 5,737,364 | A | * | 4/1998 | Cohen .................. G06F 13/385 333/25 |
| 5,754,552 | A | * | 5/1998 | Allmond et al. ............. 370/465 |
| 6,088,754 | A | * | 7/2000 | Chapman .............. H02M 3/156 710/100 |
| 6,189,052 | B1 | * | 2/2001 | Nilsson et al. ................... 710/48 |
| 6,601,124 | B1 | * | 7/2003 | Blair ........................ G06F 13/38 710/305 |
| 7,069,369 | B2 | * | 6/2006 | Chou et al. .................... 710/301 |
| 7,269,670 | B2 | * | 9/2007 | Sterrantino et al. ............ 710/16 |
| 7,401,162 | B2 | * | 7/2008 | Baker ..................... H04L 69/18 709/250 |
| 7,496,671 | B2 | * | 2/2009 | Engel et al. .................... 709/230 |
| 7,716,400 | B2 | * | 5/2010 | Raines ............................ 710/74 |
| 7,743,174 | B2 | * | 6/2010 | Remaker et al. ................ 710/11 |
| 8,208,387 | B2 | * | 6/2012 | Stueve ......................... 370/251 |
| 8,601,173 | B2 | * | 12/2013 | Sung et al. ...................... 710/15 |
| 2004/0066790 | A1 | * | 4/2004 | Valavi et al. ................. 370/419 |
| 2009/0130910 | A1 | * | 5/2009 | Inha et al. ..................... 439/638 |
| 2011/0149994 | A1 | | 6/2011 | Zimmermann et al. |

OTHER PUBLICATIONS

International Search Report and Written Opinion for PCT/US2011/054035, mailed Mar. 7, 2012; ISA/EP.

State Intellectual Property Office (SIPO) 1st Office Action issued on May 20, 2015 in corresponding Chinese Patent Application for Invention No. 201180053665.3, 10 pages.

* cited by examiner

FIGURE 1C

REMOTE ACCESS APPLIANCE WITH COMMUNICATION PROTOCOL AUTOSENSING FEATURE

CROSS-REFERENCE TO RELATED APPLICATIONS

This application is a U.S. national phase of PCT/US2011/054035 filed on Sep. 29, 2011 and published in English as WO/2012/047719 on Apr. 12, 2012. This application claims the benefit of U.S. Provisional Application No. 61/389,616 filed on Oct. 4, 2010 and U.S. Provisional Application No. 61/487,433 filed on May 18, 2011. The disclosures of the above applications are incorporated herein by reference.

FIELD

The present disclosure relates to remote access appliances used in modern day data centers, and more particularly to a remote access appliance having an autosensing subsystem that is able to detect whether a serial connection or an Ethernet connection has been made to a communication port thereof, and in one embodiment whether the serial connection involves a first predetermined pinout configuration or a second predetermined pinout configuration.

BACKGROUND

The statements in this section merely provide background information related to the present disclosure and may not constitute prior art.

A remote access appliance (hereinafter "appliance") has often been used in modern day data centers to interface with and establish communications links with a plurality of servers or other serial or Ethernet type devices. Traditionally this has required separate interfaces on the appliance, typically one for Ethernet and one for serial. The Ethernet protocol interface is typically required for communicating with a server's Service Processor Manager (SPM), while the serial interface is required for communicating with the serial console port on the server. It would be a significant advance to be able to interface the appliance to either a serial port or an Ethernet port via a single connector port on the appliance itself, and to further have the appliance automatically sense which protocol (i.e., serial or Ethernet) is communicating information to its single port at any given time.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1A:
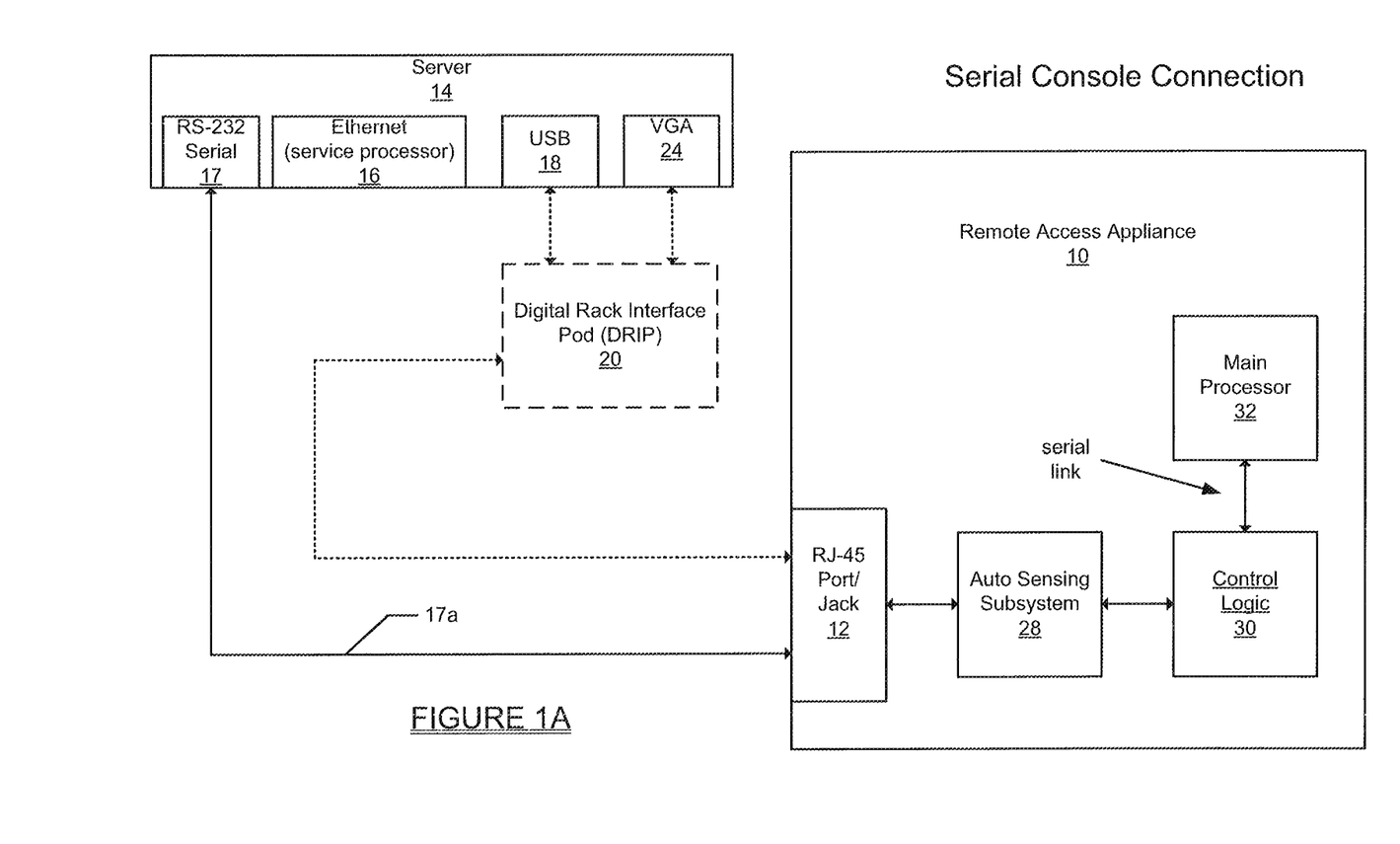
FIGS. 1A-1C are high level block diagrams illustrating several different types of connections that may be made between a communications port of a remote access appliance ("appliance") and a remote server.
Figure 1B:
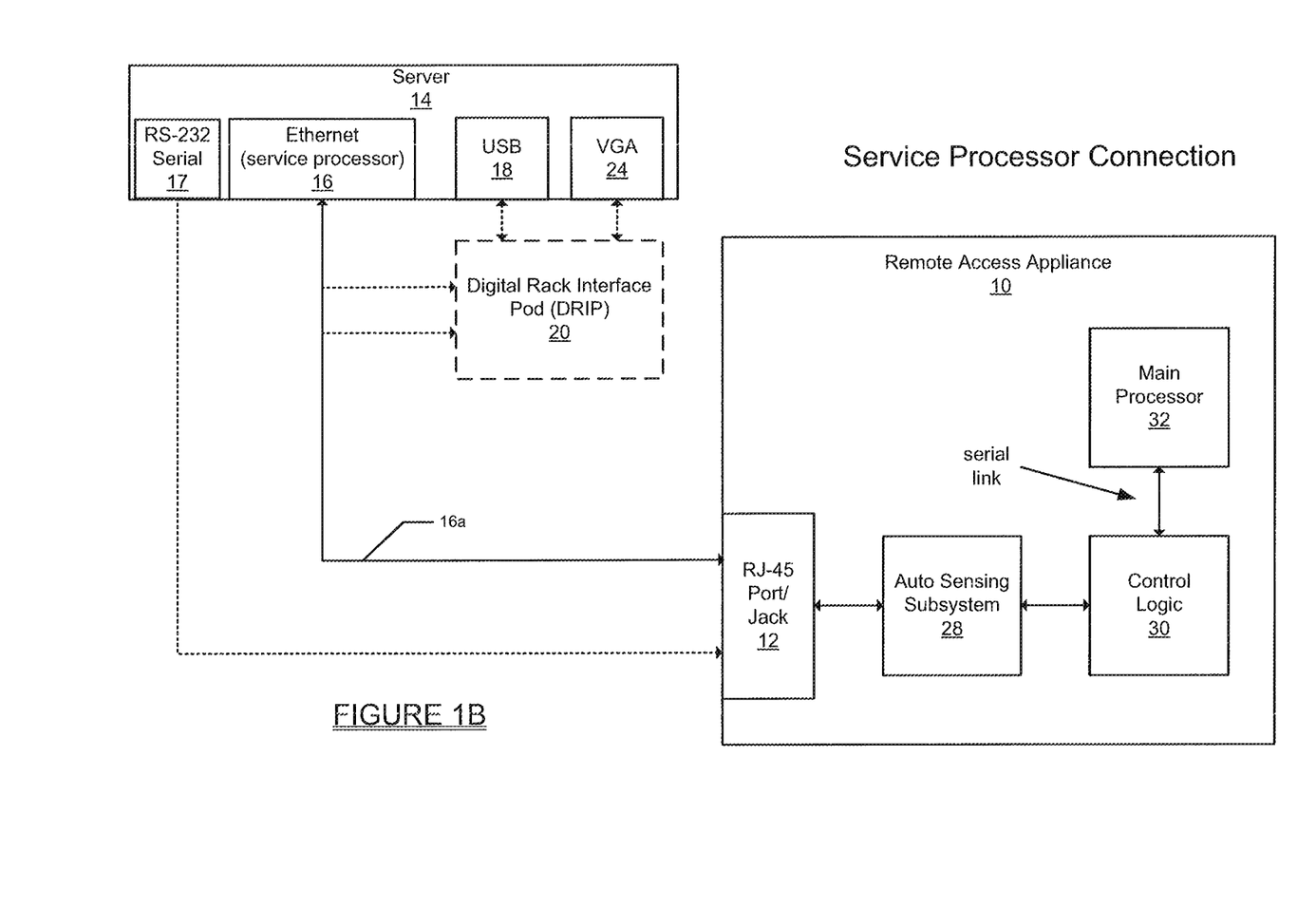
Figure 1C:
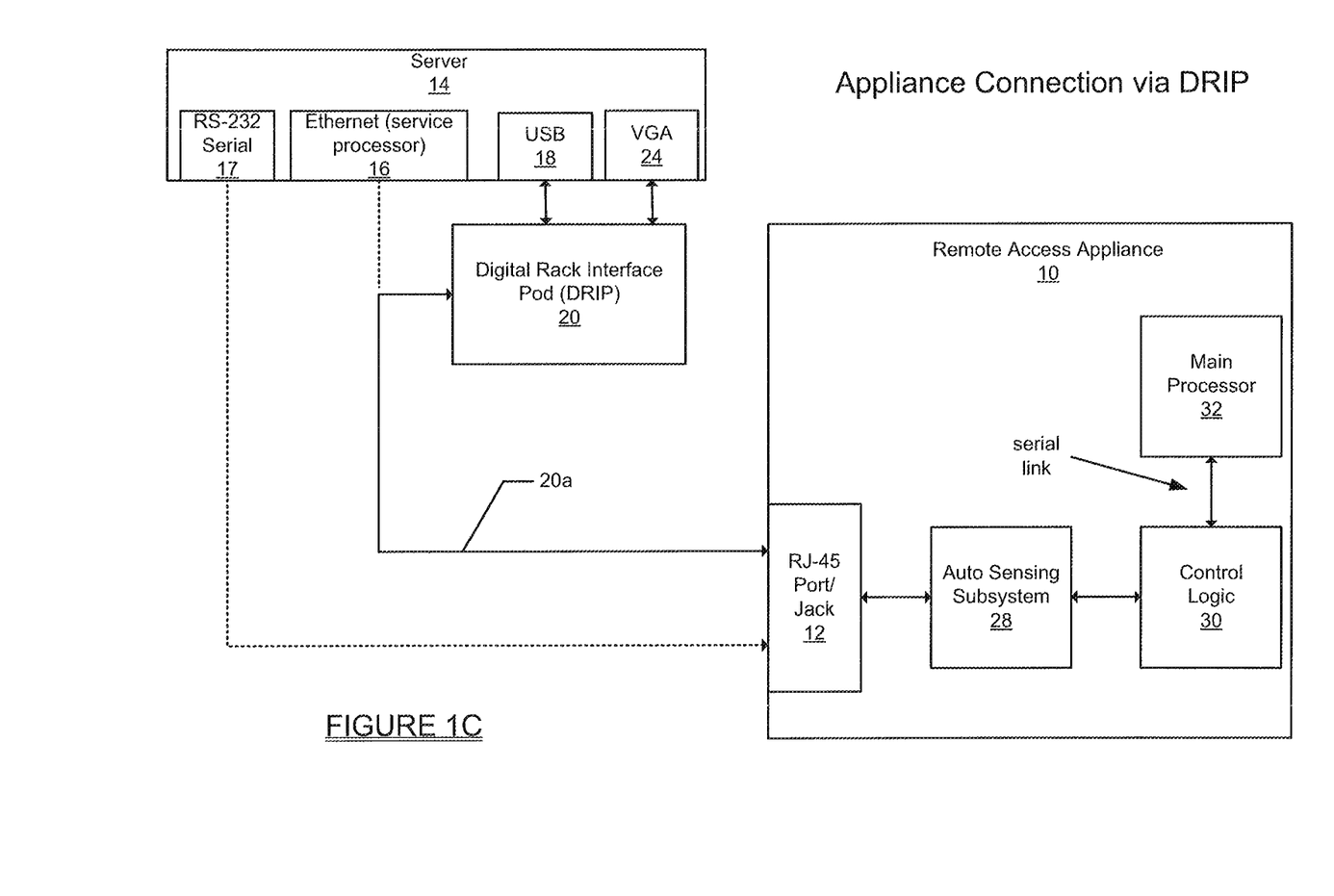

Referring to FIG. 1A, there is shown a remote access appliance (hereinafter "appliance") 10 in accordance with one embodiment of the present disclosure. The appliance 10 has a port shown as a RJ-45 port (i.e., jack) 12, which may be connected to a server 14 in at least three different ways. The first is shown in FIG. 1A via a cable 17a, typically a Cat5 cable, with a serial port 17 (e.g., a RS-232 port). This connection enables console access to the operating system (OS) running on the server 14. A second configuration is shown in FIG. 1B where the RJ-45 port 12 is coupled via a cable 16a, which is typically a Cat5 cable, to an Ethernet port 16 of the server. Typically this type of connection enables the server's Service Processor Manager (SPM) to communicate various types of relevant information on the performance of the server (e.g., processor utilization, temperature, etc.) to the appliance 10 using the Ethernet communications protocol. A third possible type of connection is shown in FIG. 1C and may involve the use of a digital rack interface pod ("DRIP") 20, such as is available from Avocent Corp. of Huntsville, Ala. The DRIP 20 typically has one VGA video cable 22 that connects to a VGA port 24 of the server 14 and a separate USB cable 26 that connects to the USB port 18. A separate Cat5 cable 20a is used to interface the DRIP 20 to the RJ-45 port 12 of the appliance 10. The DRIP 20 operates to digitize video signals from the VGA port 24 of the server 14 and to place same in Ethernet form for transmission to the appliance 10. The DRIP 20 also functions to convert keyboard/mouse data received from the appliance 10 via Ethernet to USB format and presents it to the USB port 18 on the server 14. The appliance 10 also includes an autosensing subsystem 28, a logic control subsystem 30 and a main processor 32.

As will be appreciated then, the appliance 10 may need to communicate using either Ethernet protocol signals or serial protocol signals via its RJ-45 port 12, depending on what type of device is communicating with the appliance. The appliance 10 provides the significant advantage of being able to automatically sense whether Ethernet protocol signals or serial protocol signals are being received at its RJ-45 port without any intervention from a data center individual. This is accomplished by the autosensing subsystem 28 and the control logic subsystem 30 working in combination with the main processor 32. The autosensing subsystem 28 effectively monitors the signals received on the RJ-45 port 12 and, in connection with the control logic subsystem 30 and the main processor 32, automatically internally configures various electronic components so that communications can be appropriately routed and handled within the appliance 10.

One significant benefit of the above-described autosensing feature is a reduction in the number of ports that need to be included on the appliance. The user does not have to be concerned with how many ports of each type the appliance has because each auto-sensing port supports all of the possible interfaces. If the equipment in a rack being managed by the appliance changes, ports can be changed accordingly.

Figures 2, 3:
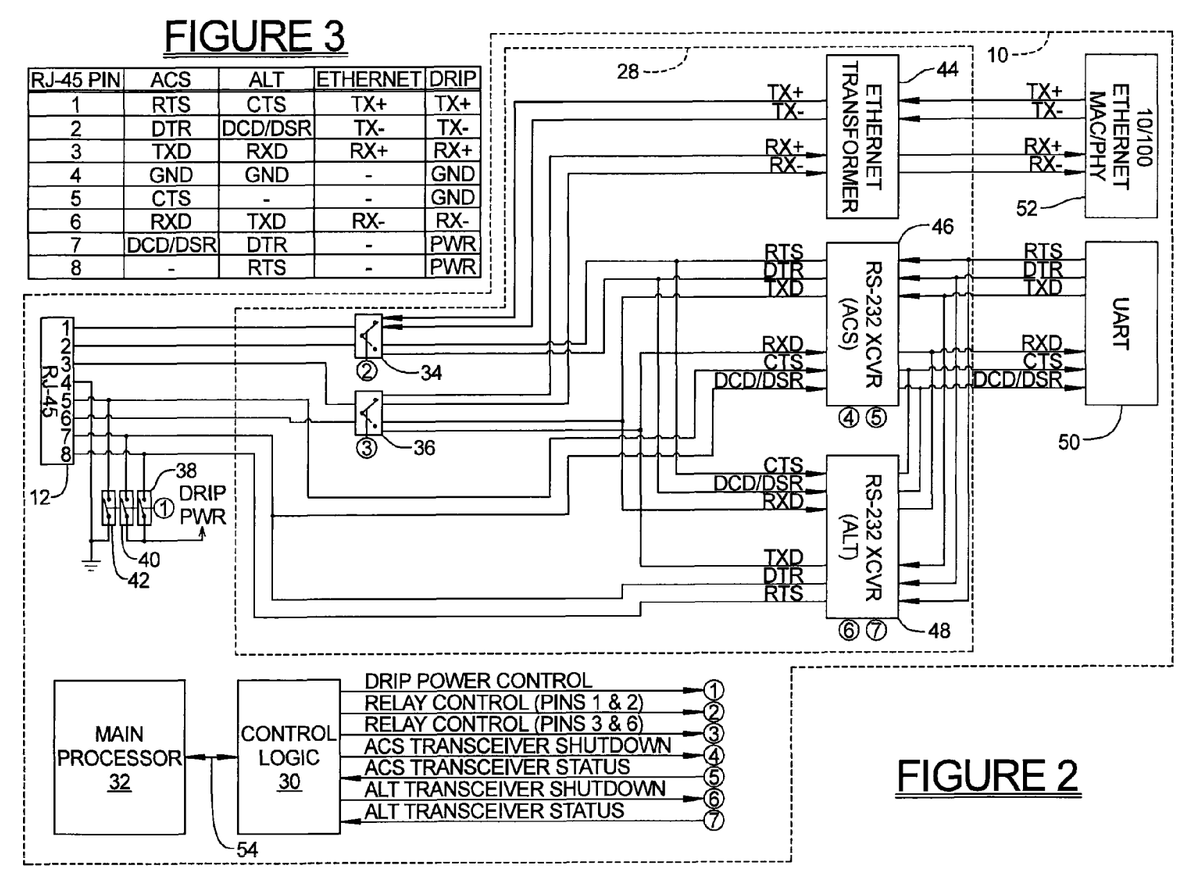
FIG. 2 is an electrical schematic diagram of an autosensing subsystem of the appliance that detects whether an Ethernet or serial protocol device has been connected to a communications port on the appliance via a communications cable, and also which is able to detect which one of two predetermined pinouts for the plug of the cable is being used when the cable is transmitting information to and from the appliance using a serial protocol.
FIG. 3 is a table showing the pinout configuration of the RJ-45 jack on the appliance when a serial connection is established with a serial device using an ACS pinout, when a serial connection is established with a serial device using an alternative ("Alt") serial pinout, when a connection is established with an Ethernet device, and when a digital rack interface pod ("DRIP") is coupled to the RJ-45 jack.

Referring now to FIG. 2, a schematic diagram of a portion of the appliance 10 is shown that illustrates in greater detail the autosensing subsystem 28 and the control logic subsystem 30. The autosensing subsystem is denoted by dashed line 28. A first relay 34 is coupled to pins 1 and 2 of the jack that forms the RJ-45 port 12. A second relay 36 is coupled to pins 3 and 6 of the same jack. A plurality of switching components 38 and 40, shown for simplicity as switches, may be incorporated for coupling DC power to the DRIP 20 and switch 42 may be provided for providing a ground path for the DRIP. In an actual implementation the switches 38-42 may be current regulator output transistors that form switched current paths. The first relay 34 is coupled to an Ethernet transformer 44 and a first RS-232 transceiver 46. The first RS-232 transceiver 46 in this example is adapted to be used when a serial connection is made at the RJ-45 port 12 with the mating RJ-45 plug having an ACS pinout configuration. The ACS pinout configuration is a pinout configuration recognized in the industry and used by Avocent Corp. on the serial ports of various forms of data center equipment available from Avocent Corp. A second RS-232 transceiver 48 is incorporated and designated with the notation "Alt", which is used for serial devices that require a different, predetermined pinout configuration. The specific Alt pinout configuration given in the Table of FIG. 3 is used for various serial devices made by Cisco Corp. and possibly other companies. It will be appreciated that other pinouts may potentially be incorporated, and the present disclosure is not limited to use with any specific pinout configuration.

As will be explained in greater detail in the following paragraphs, it is also a significant benefit that the autosensing subsystem 28 is able to automatically detect whether the ACS pinout or the Alt pinout is being used with the RJ-45 plug (and thus with the external serial device) that is connected to the RJ-45 port 12. This feature will also be described in greater detail in the following paragraphs. The ACS and Alt pinouts are shown in the table of FIG. 3 along with a pinout for an Ethernet connection and a pinout used by an Avocent Corp. manufactured DRIP 20.

Referring further to FIG. 2, both of the RS-232 transceivers 46 and 48 are coupled to a universal asynchronous receiver/transmitter (UART) 50, and the Ethernet transformer 44 is coupled to a 10/100 Ethernet/MAC/PHY interface subsystem 52. Numbers 1 through 8 at various ones of the above-mentioned components indicate where control signals from the control logic subsystem 30 may be applied as well as which components may transmit signals to the control logic subsystem 30. An important feature of the RS-232 transceivers 46 and 48 is their ability to sense when a valid RS-232 input voltage is present at any of their pins. For this purpose, one specific make of RS-232 transceiver that is especially well suited (but not necessarily required) for the present application is a 3 Driver/5 Receiver SP 3243E "intelligent" RS-232 transceiver available from Exar Corporation of Fremont, Calif. This specific model of RS-232 transceiver has a "Status" output (pin 21 on the SP3243E RS-232 transceiver) that indicates whether a valid RS-232 voltage is present at any of its input pins. This detection feature was principally intended for low power applications where it is desired to power down the RS-232 transceiver when no serial cable is plugged into the serial port that is in communication with the RS-232 transceiver. The operation of the present appliance 10, however, takes advantage of the fact that normal 10/100 Ethernet voltages fall outside (i.e., below) the range of valid RS-232 signal levels. Accordingly, the "Status" output pin of the SP3243E RS-232 transceiver will not falsely detect Ethernet signals as valid RS-232 signals, as the voltages associated with the Ethernet signals will be below those of valid RS-232 signals. This feature allows use of the RJ-45 port 12 to bidirectionally communicate Ethernet signals to and from the appliance 10 without the two RS-232 transceivers 46 and 48 recognizing the presence of the Ethernet signals and falsely interpreting the Ethernet signals as RS-232 signals.

Referring further to FIG. 2, the two relays 34 and 36 are shown in their default positions (i.e., in Ethernet "mode"). Power to the DRIP 20 is disabled as a result of switches 38-42 being in the positions shown in FIG. 2. Pins 1, 2, 3 and 6 from the jack that forms the RJ-45 port 12 are connected to the Ethernet transformer 44. Both of the RS-232 transceivers 46 and 48 will be shut down. No signals will be present on pins 5, 7 and 8, and pin 4 is tied to ground. If the DRIP 20 is the component which is coupled to the RJ-45 port 12, then the DRIP 20 will receive power from the USB port of the device, which in one example could be the USB port 18 of server 14 as shown in FIG. 1. The main processor 32 will virtually immediately recognize that an Ethernet device (i.e., the DRIP 20) has been connected to the RJ-45 port 12 as it starts communicating with the DRIP 20. In a very short time period, typically within just seconds or less, the main processor 20 will recognize that the Ethernet device is the DRIP 20, and will then send a command to the control logic subsystem 30 that closes switches 38 and 40. This causes DC power (typically +10.8 volts) to be applied to pins 7 and 8 of the RJ-45 port 12 to be used by the DRIP 20 if needed (with a ground for return currents switch in on pin 5 of the RJ-45 port 12, and the other path of return current of non-switched pin 4 of the RJ-45 port). If the session with the DRIP 20 ends for any reason (e.g., the DRIP 20 is unplugged from the RJ-45 port 12), then the main processor 32 will automatically and virtually immediately signal the control logic subsystem 30 to turn off power to the DRIP 20 by deactivating the switches 38 and 40 that form switched current paths. This interrupts the application of DC power to pins 7 and 8 of the RJ-45 port 12 and opens up the switched current return path of pin 5 of the RJ-45 port 12.

If an unknown device is physically connected to the jack that forms the RJ-45 port 12 but there is no Ethernet activity detected to be occurring on the RJ-45 port 12, the main processor 32 will send an "autosense" command to the control logic subsystem 30. This causes the control logic subsystem 30 to turn off DRIP 20 power by deactivating switches 38 and 40 and thus their switched current paths, as well as to power down both RS-232 transceivers 46 and 48. The first relay 34 will be left as shown in FIG. 2 connecting pins 1 and 2 of the RJ-45 port 12 to the Ethernet transformer 44. However, the control logic subsystem 30 will cause the second relay 36 to be switched to a "serial mode". This couples pin 3 of the RJ-45 port 12 to the TXD pin of RS-232 transceiver 46 and to the RXD pin of RS-232 transceiver 48. It also couples pin 6 to the RXD pin of the RS-232 transceiver 46 and to the TXD pin of the RS-232 transceiver 48. The control logic subsystem 30 will then check the status signals from the RS-232 transceivers 46 and 48 to look for the presence of valid RS-232 voltage level signals on the RXD pin of either RS-232 transceiver 46 or 48.

If the control logic subsystem 30 detects the presence of a valid RS-232 voltage level signal on the RS-232 transceiver 46, which means a valid RS-232 level signal on pin 6 of the RJ-45 port 12 is present, this indicates that a connection has just occurred with a serial device having an ACS pinout. The control logic subsystem 30 then enables (powers up) the RS-232 (ACS) transceiver 46 and switches the relay 34 to serial mode, as indicated in phantom in FIG. 2. This connects pins 1 and 2 of the RJ-45 port 12 with the RTS and DTR pins of the RS-232 (ACS) transceiver 46. Serial communications will then be fully enabled using the RS-232 (ACS) transceiver 46.

If the status signal from the RS-232 (Alt) transceiver 48 indicates that a valid RS-232 level voltage signal has been received on its RXD input via pin 3 of the RJ-45 port 12, then the control logic subsystem 30 powers up the RS-232 (Alt) transceiver 48 and switches the relay 34 to the serial mode, which is shown in phantom in FIG. 2. In the serial mode pins 1 and 2 of the RJ-45 port 12 are connected with the CTS and DCD/DSR pins of the RS-232 (Alt) transceiver 48. Pins 3 and 6 of the jack forming the RJ-45 port 12 will be connected through the relay 36 with the RXD pin and TXD pin, respectively, of the RS-232 (Alt) transceiver 48. Serial communications will then be fully enabled using the RS-232 (Alt) transceiver 48.

If both RS-232 transceivers 46 and 48 generate status signal outputs to the control logic subsystem 30 that indicates that valid RS-232 level voltage signals are being received on their inputs, then it is understood that an invalid serial pinout is being used on the RJ-45 plug that has been coupled to the RJ-45 port 12. In this instance both RS-232 transceivers 46 and 48 will be left powered down by the control logic subsystem 30.

If neither RS-232 transceiver 46 or 48 generates a status signal output to the main processor indicating a valid RS-232 level voltage at its input, then the control logic subsystem 30 switches relay 36 back to Ethernet mode (shown in solid lines in FIG. 2) for a short period of time, for example, 5 seconds. If the main processor 32 detects that an Ethernet link on the 10/100 Ethernet MAC/PHY interface subsystem 52 has been established during that period of time, it sends a command to the control logic subsystem 30 to leave the relays 34 and 36 in Ethernet mode and discontinue the "autosense" operation. If the main processor 32 does not detect an Ethernet link during this time, the control logic subsystem 30 will continue the "autosense" operation, switching relay 36 between Ethernet and serial modes until either an Ethernet signal is detected or a valid RS-232 voltage signal is detected, as described above.

If one or the other of the RS-232 transceivers 46 or 48 is operating but then the RS-232 level signals are lost, such as if the RJ-45 plug is removed from the RJ-45 port 12, then the control logic subsystem 30 notifies the main processor 32, which may optionally command the control logic subsystem 30 to restart the "autosense" operation as described above.

It is important to note that the appliance 10 is able to distinguish between ACS and Alt serial pinouts because there are no RJ-45 pins that are inputs in both pin-out configurations. So only one of the two RS-232 transceivers 46 or 48 will detect valid RS-232 signal input levels when one or the other of the ACS or Alt pinouts is used.

If an Ethernet device is connected to the RJ-45 port 12, it will not be detected as a serial device, and the above described operational sequence will reach the implementation of the 5 second delay time. This delay time allows the Ethernet MAC/PHY interface subsystem 52 time to establish a link. When the main processor 32 sees an Ethernet link, it will tell the control logic subsystem 30 to stop autosensing and stay in Ethernet mode. At any point during the above described operations, the main processor 32 may query the control logic subsystem 30 to determine the state of the RJ-45 port 12 or to force it into a particular mode.

The autosensing feature of the appliance 10 thus provides a significant and highly advantageous means for monitoring and immediately detecting the presence of an Ethernet device or a serial device that has been connected to its RJ-45 port. An even further advantage is that the appliance of the present disclosure is able to automatically sense the specific pinout (i.e., either an ACS or Alt pinout) of a serial device that has been connected to its RJ-45 port, and to accommodate the sensed pinout without the need for the data center individual to set any configuration switches on the appliance 10 or to otherwise take any other action. The ability of the appliance 10 to communicate both Ethernet and serial protocol signals over a single port can provide significant flexibility to the user in the event cabling coupled to a given one of the autosensing ports on the appliance 10 needs to be uncoupled from one type of port on a remote device (e.g., an Ethernet port) and re-coupled to a different type of port (e.g., a USB port).

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A remote access appliance adapted to sense a communications protocol of a device coupled to the remote access appliance via a cable, the appliance comprising:
   a jack forming a port to which either an Ethernet device or a serial device may be coupled, the jack including a plurality of pins;
   an autosensing subsystem in communication with selected ones of the pins of the jack and configured to detect when signals on specific ones of said pins are present when any one of an Ethernet device, a first serial device using a first pinout configuration, or a second serial device using a second pinout configuration is coupled to the jack via the cable, to thus indicate and identify a connected device as being the Ethernet device, the first serial device or the second serial device; and
   a control logic subsystem responsive to the autosensing subsystem that controls at least one component of the autosensing subsystem so that the signals at the jack are handled as:
      Ethernet protocol signals; or
      as serial protocol signals in accordance with the first pinout configuration; or
      as serial protocol signals in accordance with the second pinout configuration; and
   a plurality of switches controlled by the control logic subsystem for applying backup power to the jack, the backup power available to be used by an Ethernet device which is coupled to the jack only in the event that primary power to the Ethernet device from an external subsystem communicating with the Ethernet device is lost.

2. The appliance of claim 1, wherein the autosensing subsystem further includes a first switching component and a second switching component controlled by the control logic subsystem, the first and second switching components selectively coupling signals at the pins of the jack to one of an Ethernet transformer or a serial transceiver.

3. The appliance of claim 1, wherein the plurality of switches comprises a plurality of power switches, the plurality of power switches being responsive to the control logic subsystem and operable to control the application of the backup power to selected ones of the plurality of pins of the jack only when the Ethernet device which is detected as having been connected to the jack forms a specific, predetermined type of Ethernet device and;

the control system further being configured to automatically detect when the specific, predetermined type of Ethernet device has been uncoupled from the jack, and to automatically remove the backup power from the selected ones of the plurality of pins of the jack.

4. The appliance of claim 1, wherein the autosensing subsystem further includes: a first switching component; a second switching component; an Ethernet transformer responsive to signals from the first and second switching components; a first RS-232 serial transceiver responsive to signals from both of the switching components; a second RS-232 serial transceiver responsive to signals from both of the switching components; the switching components being controlled by the control logic subsystem to make and break a connection between the jack and the Ethernet transformer, depending on whether an RS-232 level signal is sensed on one or more selected pins of the jack; and the switching components further being controlled to selectively couple selected ones of the pins of the jack to selected inputs of the RS-232 serial transceivers.

5. The appliance of claim 1, wherein the autosensing subsystem further includes a pair of serial transceivers responsive to the control logic subsystem, and wherein the control logic subsystem turns on only one of the pair of serial transceivers depending which specific pins of said jack are sensed to have a signal present thereon.

6. The appliance of claim 5, wherein both of the serial transceivers comprise RS-232 serial transceivers, and each one of the RS-232 serial transceivers generates an output signal when it receives a signal of a predetermined voltage level on a specified input thereof, the signal of a predetermined voltage level being of a level that indicates that a valid RS-232 device has been coupled to the jack.

7. The appliance of claim 4, wherein the generation of the signal by one of the RS-232 transceivers also indicates which one of the first or second pinout configurations that the serial device that has been connected to the jack is using.

8. The appliance of claim 7, further comprising a universal asynchronous receiver/transmitter (UART) responsive to both of the RS-232 transceivers.

9. A remote access appliance adapted to sense a communications protocol of a device coupled to the remote access appliance via a cable, the appliance comprising:
a jack forming a port to which either an Ethernet device or a serial device may be coupled, the jack including a plurality of pins;
an autosensing subsystem having: a plurality of switching elements in communication with selected ones of the pins of the jack and configured to detect when signals on specific ones of the pins are present when either an Ethernet device or a serial device is coupled to the jack via a cable, to thus indicate the presence of either the Ethernet device or the serial device; and a pair of RS-232 serial transceivers, with a first one of the transceivers configured to accommodate a first serial pinout configuration used by a first serial device, and a second one of the RS-232 serial transceivers configured to accommodate a second serial pinout configuration used by a second serial device;
a control logic subsystem responsive to the autosensing subsystem that controls the switching elements and the RS-232 serial transceivers so that the signals at the jack are handled as either Ethernet protocol signals or as serial protocol signals, and when the signals are detected as being serial signals, then using an output from each of the RS-232 serial transceivers to determine whether the serial device connected to the jack is the first serial device or the second serial device; and
a plurality of switches responsive to the control logic subsystem for applying backup power to select ones of the plurality of pins of the jack when an Ethernet device is detected as having been coupled to the jack, and the Ethernet device is further detected as being a specific, predetermined type of Ethernet device, and wherein the backup power is available for use by the specific, predetermined type of Ethernet device only when primary power from an external subsystem powering the specific, predetermined type of Ethernet device becomes unavailable.

10. The appliance of claim 9, wherein the plurality of switches comprises a plurality of power switching elements controlled by the control logic subsystem for selectively applying backup power to selected ones of the pins of the jack when the specific, predetermined type of Ethernet device is detected as having been coupled to the jack; and
wherein the control logic subsystem further operates to automatically detect when the specific, predetermined type of Ethernet device has been uncoupled from the jack and to automatically remove the backup power to the selected ones of the plurality of pins of the jack.

11. The appliance of claim 10, wherein the backup power is only applied to the selected pins of the jack when the specific, predetermined type of Ethernet device is detected to be a digital rack interface pod.

12. The appliance of claim 9, wherein each of the RS-232 serial transceivers each generate a signal on a specific pin thereof when a specific level of signal is received on at least one of its inputs, the specific level of signal indicating that a device coupled to the jack is an RS-232 serial device rather than an Ethernet device.

13. The appliance of claim 9, wherein the autosensing subsystem includes an Ethernet transformer, and the plurality of switching elements includes first and second switching elements that each are coupled to selected ones of the pins of the jack, and which connect the selected ones of the pins to either the Ethernet transformer or the RS-232 serial transceivers.

14. The appliance of claim 9, wherein the control logic subsystem is configured to turn only one of the serial RS-232 transceivers depending on which one of the two serial pinout configurations is detected.

15. A method for controlling a remote access appliance to sense a communications protocol of a device coupled to the remote access appliance via a cable, the method comprising:
using a jack to form a port to which either an Ethernet device or a serial device may be coupled via the cable, wherein the jack includes a plurality of pins;
sensing when at least one selected pin of the jack has a voltage signal present thereon when a device is coupled to the jack, which indicates that the device is an Ethernet device, or a first serial device using a first pinout configuration, or a second serial device using a second pinout configuration;
using a control logic subsystem to control a plurality of switching elements to connect the pins of the jack to internal components of the appliance such that the appliance is able to then communicate with the device using one of an Ethernet communications protocol, or a serial communications protocol implemented using the first pinout configuration, or the serial communications protocol implemented using the second pinout configuration; and further using the control logic subsystem to apply a backup power signal to selected ones of the plurality of pins of the jack only when the device detected is detected to be a specific, predetermined type of Ethernet device which would ordinarily be powered by an external subsystem communicating with the specific, predetermined type of Ethernet device.

16. The method of claim 15, wherein the control logic subsystem selectively connects the certain pins of the jack to either an Ethernet element or a plurality of serial transceivers.

17. The method of claim 16, further comprising sensing when a specific input of each of the serial transceivers has a voltage signal thereon, and using the voltage signal at the specific input to determine which one of the first or second pinout configurations is being used with the device.

18. The method of claim 15, further comprising sensing that the specific, predetermined type of Ethernet device is a digital rack interface pod; and further using the control logic subsystem to automatically remove power from the select ones of the plurality of pins of the jack when uncoupling of the digital rack interface pod from the jack is detected.

19. A remote access appliance adapted to sense a communications protocol of a device coupled to the remote access appliance via a cable, the appliance comprising:

a jack forming a port to which either an Ethernet device or a serial device may be coupled, the jack including a plurality of pins;

an autosensing subsystem having: a plurality of switching elements in communication with selected ones of the pins of the jack and configured to detect when signals on specific ones of the pins are present when either an Ethernet device or a serial device is coupled to the jack via a cable, to thus indicate the presence of either the Ethernet device or the serial device; and a pair of RS-232 serial transceivers, with a first one of the transceivers configured to accommodate a first serial pinout configuration used by a first serial device, and a second one of the RS-232 serial transceivers configured to accommodate a second serial pinout configuration used by a second serial device;

a control logic subsystem responsive to the autosensing subsystem that controls the switching elements and the RS-232 serial transceivers so that the signals at the jack are handled as either Ethernet protocol signals or as serial protocol signals, and when the signals are detected as being serial signals, then using an output from each of the RS-232 serial transceivers to determine whether the serial device connected to the jack is the first serial device or the second serial device;

a plurality of power switching elements controlled by the control logic subsystem for selectively applying backup power to selected ones of the pins of the jack when a specific type of Ethernet device is detected as having been coupled to the jack; and wherein the backup power is only applied to the selected pins of the jack when the specific type of Ethernet device is detected to be a digital rack interface pod.

20. A method for controlling a remote access appliance to sense a communications protocol of a device coupled to the remote access appliance via a cable, the method comprising:

using a jack to form a port to which either an Ethernet device or a serial device may be coupled via the cable, wherein the jack includes a plurality of pins;

sensing when at least one selected pin of the jack has a voltage signal present thereon when a device is coupled to the jack, which indicates that the device is an Ethernet device or a serial device;

using a control logic subsystem to control a plurality of switching elements to connect the pins of the jack to either an Ethernet element or a plurality of serial transceivers, such that the appliance is able to then communicate with the device using one of an Ethernet communications protocol or a serial communications protocol;

wherein the sensing is further performed to sense when a specific input of each of the serial transceivers has a voltage signal thereon, and using the voltage signal at the specific input to determine which one of two different serial pinout configurations is being used with the device; and when the device is sensed to be the Ethernet device, then applying a backup power signal to selected pins of the jack after determining that the Ethernet device is a certain type of Ethernet device; and further sensing that the certain type of Ethernet device is a digital rack interface pod.

* * * * *